(12) United States Patent
Ford

(10) Patent No.: US 6,892,746 B2
(45) Date of Patent: May 17, 2005

(54) METHOD AND SYSTEM FOR CONTROLLING A HOUSEHOLD WATER SUPPLY INCORPORATING MOTION-SENSING FOR DETERMINING WHETHER A HOUSE IS OCCUPIED

(76) Inventor: Michael Brent Ford, 27691 Rio Vista, St. George, UT (US) 84970

( * ) Notice: Subject to any disclaimer, the term of this patent is extended or adjusted under 35 U.S.C. 154(b) by 0 days.

(21) Appl. No.: 10/743,232

(22) Filed: Dec. 23, 2003

(65) Prior Publication Data
US 2004/0134545 A1 Jul. 15, 2004

Related U.S. Application Data

(63) Continuation-in-part of application No. 10/122,880, filed on Apr. 11, 2002, now Pat. No. 6,691,724.

(51) Int. Cl.$^7$ .............................. F16K 31/02; E03B 7/00
(52) U.S. Cl. ...................... 137/1; 137/624.11; 137/39; 137/59; 251/129.04

(58) Field of Search ................................ 137/1, 624.11, 137/624.12, 59, 38, 39; 251/129.04; 4/623

(56) References Cited

U.S. PATENT DOCUMENTS

| | | | |
|---|---|---|---|
| 4,730,637 A | * | 3/1988 | White .......................... 137/62 |
| 5,038,820 A | * | 8/1991 | Ames et al. ............ 137/624.12 |
| 5,347,264 A | * | 9/1994 | Bjorkman ................. 137/487.5 |
| 6,414,601 B1 | * | 7/2002 | Massedonio ................... 137/39 |

* cited by examiner

Primary Examiner—Kevin Lee
(74) Attorney, Agent, or Firm—A. Mitchell Harris; Jeffrey Weiss; Weiss, Moy & Harris, P.C.

(57) ABSTRACT

A method and system for controlling a household water supply incorporating motion-sensing for determining whether a house is occupied, provides protection of structures and fixtures from water damage due to plumbing failure or other causes. The household water supply is shut-off in conformity with a determination that the household is unoccupied and thereby provides automatic protection from water damage.

15 Claims, 5 Drawing Sheets

METHOD AND SYSTEM FOR CONTROLLING A HOUSEHOLD WATER SUPPLY INCORPORATING MOTION-SENSING FOR DETERMINING WHETHER A HOUSE IS OCCUPIED

CROSS REFERENCE TO RELATED APPLICATIONS

The present application is a Continuation-in-Part of U.S. patent application Ser. No. 10/122,880 entitled "METHOD AND SYSTEM FOR CONTROLLING A HOUSEHOLD WATER SUPPLY" filed on Apr. 11$^{th}$, 2002, now U.S. Pat. No. 6,691,724 the specification of which is herein incorporated by reference.

BACKGROUND OF THE INVENTION

1. Field of the Invention

The present invention relates generally to water control systems, and more specifically, to a system for controlling a household water supply.

2. Background of the Invention

Water supplies connected to a household are typically controlled only at the points of service, e.g., sink faucets, shower valves and appliances that connect to the water supply provide individual shut-off for water flow. The household water supply connection is typically controlled by a manual external valve that can be used to shut-off water flow in the event of an emergency water leak or for servicing the water supply system plumbing or replacing appliances.

Flooding due to plumbing failures is a major source of damage to structures and fixtures such as carpeting, wood flooring, wallboard, etc. The most frequent water supply emergency events are failure due to freezing temperatures inside the water supply plumbing and failure of the water heater tank. A freezing condition usually occurs when the house is unoccupied, for example, a vacation home that is unoccupied during winter is at risk for damage due to bursting of water supply lines due to freezing. Other water supply emergency events may occur when the house is unoccupied, such as failure of a polyvinyl chloride (PVC) plumbing joint, or water heater tank wall erosion and leakage.

Since water pressure needs to be available while persons are present in the household, the supply pressure must be available when the household is occupied. Also, certain automatic water users such as icemakers, dishwashers and washing machines make automatic demands on the water supply that may occur when the household is unoccupied. It is also inconvenient to manually control a household water supply upon entering or exiting a household.

Systems have been implemented that shut off the household water supply in response to detection of leaks using detectors located near water heaters, sinks, etc. But, these systems only protect against leaks where water reaches the detectors and could require a large number of detectors for adequate coverage. Other systems have been developed that measure water flow and shut off the water supply if excessive flow occurs based on whether or not the house is occupied as programmed manually by a switch. The flow type systems typically use flow meters that are incapable of detecting water flows below a certain threshold, such as a dripping faucet.

Therefore, it would be desirable to provide a method and system for controlling a household water supply to prevent flooding. It would further be desirable to control a household water supply in a manner that automatic water users are able to obtain water for a limited time, while preventing leaks that occur while the water supply is not being used.

SUMMARY OF THE INVENTION

The above objective of preventing flooding due to plumbing failure is achieved in a method and system that automatically control a water supply for an entire house or branches thereof feeding multiple water receiving appliances or fixtures. The system includes an electrically controllable valve, a motion sensor and a control system for controlling the automatic valve in conformity with a motion detector output. The motion sensor has a detection range that extends substantially beyond the vicinity of a single appliance or fixture, so that motion in the household in general is detectable in order to determine whether or not the household is occupied. A timer may be used to determine whether motion has not occurred for a long period of time, and if so, the automatic valve is shut off. Various alarms may be used in conjunction in the above system, such as thermal and seismic alarms that immediately shut off the water The foregoing and other objectives, features, and advantages of the invention will be apparent from the following, more particular, description of the preferred embodiment of the invention, as illustrated in the accompanying drawings.

DETAILED DESCRIPTION OF THE PREFERRED EMBODIMENTS

The above-incorporated parent patent application discloses and claims a method and system for controlling a household water supply in conformity with a detected flow and a motion sensor that determines whether or not there is activity within a household. The present continuation-in-part concerns particular embodiments of the previously-disclosed system that do not require flow detection, thus providing water control to a household at reduced cost. The motion detectors of the present invention have a detection range that encompasses an area significantly greater than the local around a specific water fixture or water-supplied appliance, distinguishing the operation of the present invention from such fixtures as faucets and toilets that are operated based on motion detection for use in public facilities.

Motion sensors are located within the household or at particular locations such as entrances, so that occupancy of the house may be determined via detection of motion of a person or persons and an electrically controllable valve can shut off branch plumbing lines to the entire house, or sections thereof that connect to multiple water fixtures.

Figure 1:
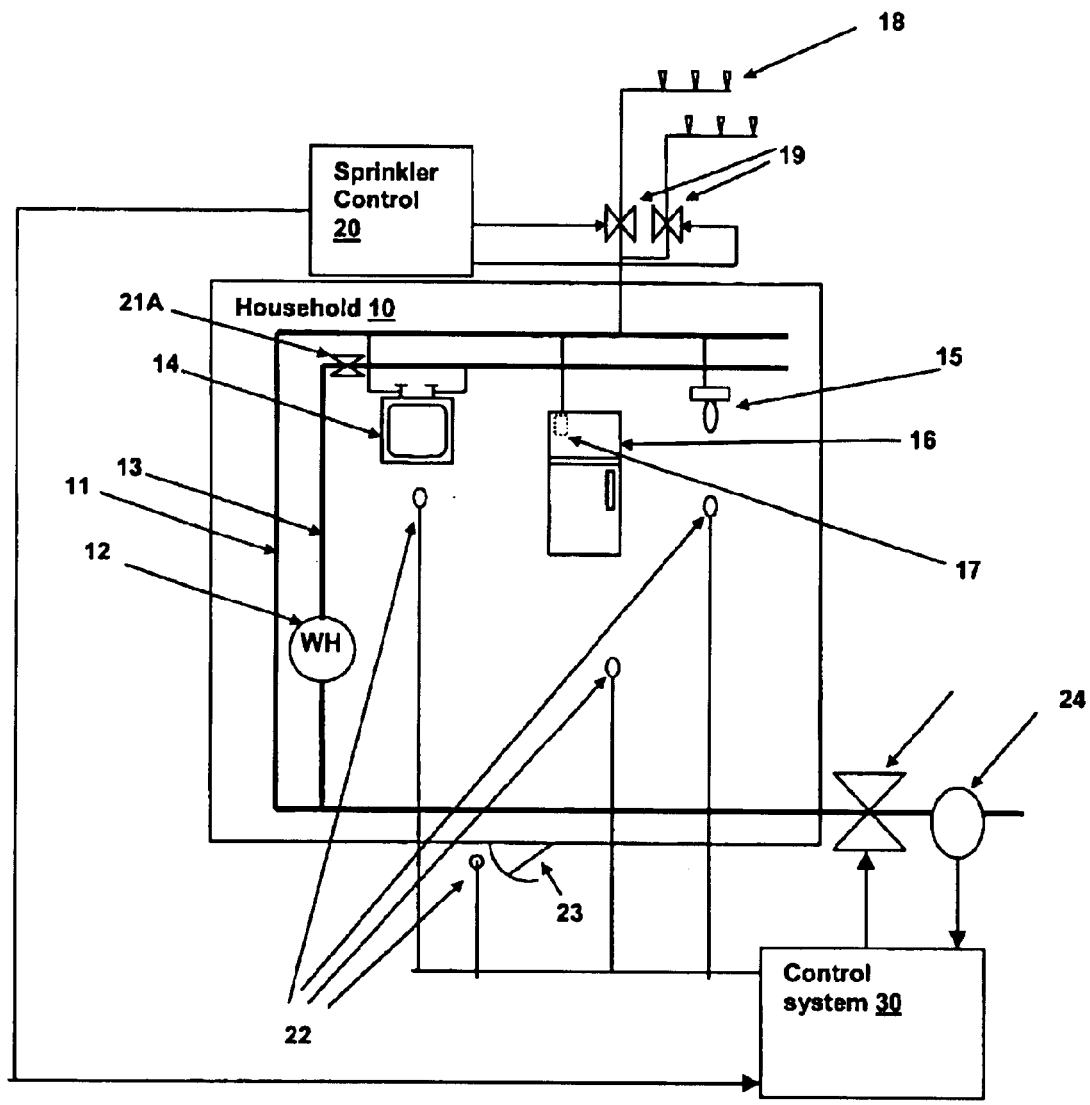
FIG. 1 is a schematic diagram depicting a household water supply coupled to a system in accordance with an embodiment of the present invention.

Referring now to the figures and in particular to FIG. 1, a household water supply coupled to a system in accordance with an embodiment of the present invention is shown.

Within household 10, a cold water supply line 11 routes the water supply to various fixtures such as sinks 14, a refrigerator 16 containing an ice maker 17 toilets 15, and so forth. A water heater 12 is also coupled to cold water supply line 11, to supply a hot water supply line 13, which is routed to sinks 14 and other fixtures in household 10. Hot water supply line is shown optionally controlled by an electrically controllable valve 21A, to illustrate a branch plumbing line that feeds multiple fixtures that is controlled by feedback from a motion sensing system. Cold water supply line 11 is also coupled to lawn sprinklers 18 by electrically controlled sprinkler valves 19 that are activated and deactivated by an electric sprinkler control 20 system.

Water pressure for the entire household 10 water supply system is provided by a water supply main coupling controlled by electrically controllable valve 21. (Alternatively a portion of the household water supply may be controlled via valve 21A and multiple valves may be used to control such a system, which is particularly useful in such structures as duplexes.) A control system 30 in accordance with an embodiment of the present invention is electrically coupled to electrically controlled valve 21, to shut off the water supply to household 10 in the presence of a detected abnormal flow condition. Flow of water into household 10 may be detected by flow meter 24 which is generally a positive flow meter as described in co-pending U.S. patent application entitled: "POSITIVE FLOW METER", Ser. No. 10/122,877 filed on Apr. 11, 2002, the specification of which is incorporated herein by reference. However, a flow meter is not required for operation of the present invention, as the control of the household water supply or a plumbing branch feeding multiple water supplying fixtures may be based entirely on detected occupancy of the household.

However, use of a valve in accordance with the embodiment described in the above-referenced patent application permits the detection of very small flow rates associated with small leaks. As the present invention detects a leak in accordance with starting and stopping of water flow, a valve that can measure a very small continuous flow is exceptionally useful in embodiments of the present invention.

Within household 10, are located motion sensors 22, providing an indication of occupancy of household, and consequently, whether water may be in normal use by an occupant of household 10. A motion sensor 22 may also be located near an entrance 23 in addition to or in alternative to locating motion sensors 22 throughout household 10. If motion sensors 22 are located adjacent to every used entrance 23 of household 23, occupancy may be determined, but generally not activity of occupants. If motion sensors 22 are located throughout household 10, the system of the present invention may control water flow in accordance with activity of occupants by shutting off various branch plumbing lines.

Control system 30 derives information from motion sensors 22 and (optionally flow meter 24) in order to control the household 10 water supply via electrically controllable valve 21. Information from other sensors for detecting abnormal conditions may also be provided to control system 30 as well as manual controls and operating controls. Sprinkler control 20 is electrically coupled to control system 30 to provide a signal of normal sprinkler usage.

Figure 2:
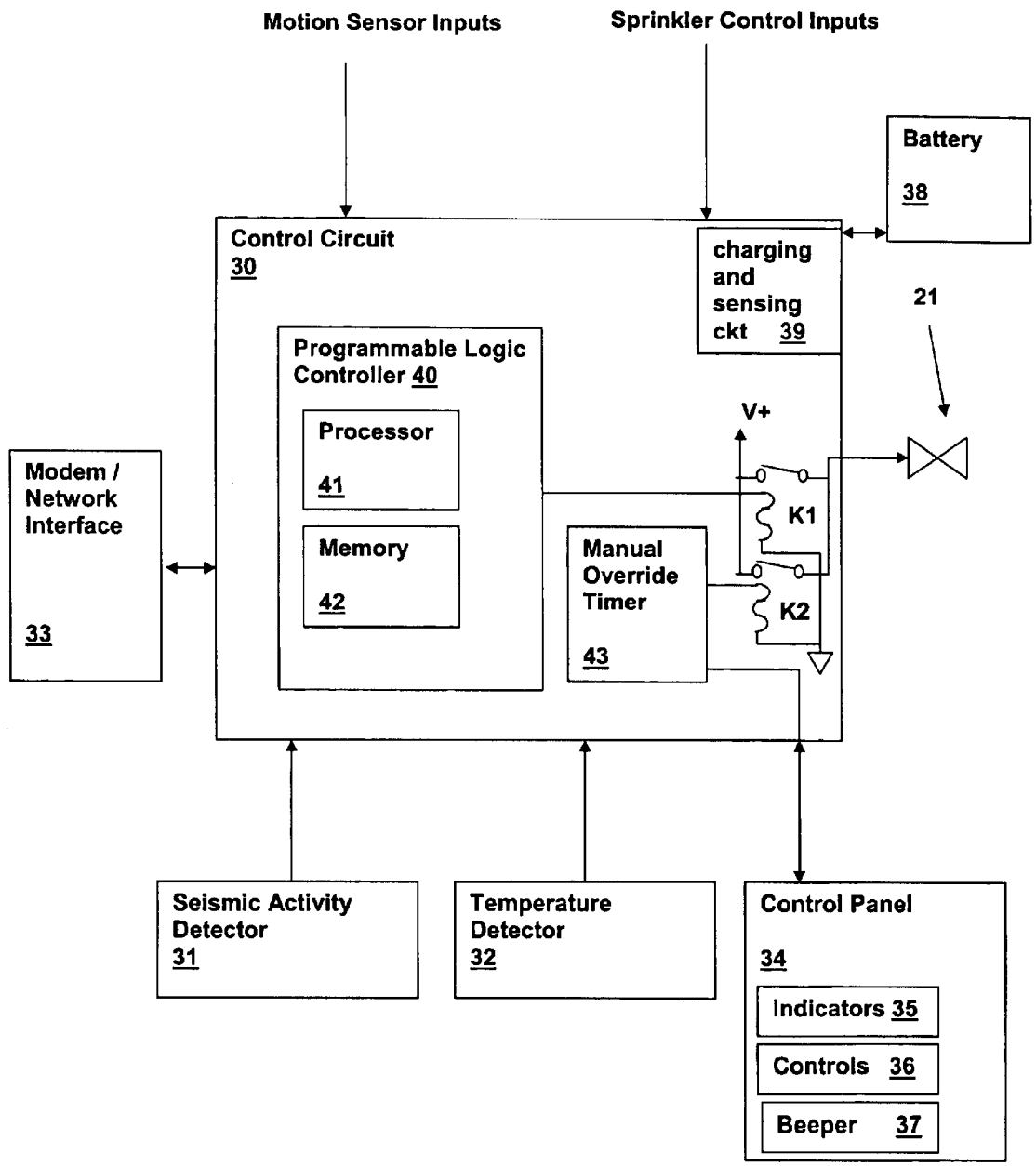
FIG. 2 is a block diagram depicting a system in accordance with an embodiment of the present invention.

Referring now to FIG. 2, details of control circuit 30 and its interconnections are depicted. Control circuit 30 receives motion sensor inputs and sprinkler control inputs, as well as an input from a seismic activity detector 31, a temperature detector 32 and a control panel 34. Temperature detector 32 is used to predict potentially freezing conditions within cold water supply line 11 and electrically controllable valve 21 may be shut off in conformity with detecting the potentially freezing condition. Likewise, seismic activity detector 31 provides an indication of earthquake activity, and electrically controllable valve 21 may be shut off in conformity with detecting an earthquake. Temperature detector 32 and seismic activity detector 31 may be switches activated upon detection of the associated event, or they may be sensors and the detection circuitry may be provided within control circuit 30.

Control panel 34 provides for manual control of control circuit (and thus the system of the present invention) via controls 36 and provides an indication of operational state via visual indicators 35 and a beeper 37 for providing an audible alarm. Remote control and indication of state may be provided by a modem/network interface 33 which may be coupled to a telephone network or other suitable network connection such as Digital Subscriber Link (DSL), cable modem or a router connection deriving therefrom. Control operations may be performed within control circuit 30 in response to codes received by modem/network interface 33 and system status may be provided by control circuit 30 to a remote location via modem/network interface 33.

Within control circuit 30, control is provided by program code executed from memory 42 by a processor 41. Memory 42 and processor 41 are provided by a programmable logic controller 40, although other forms of processing system such as single board computers, may be used to implement control algorithms in accordance with the present invention and dedicated circuits may also be used. A particular advantage of programmable logic controller 40 is that remote control modules such as X10 controllers are commercially available to couple control circuit 30 to various sensors, e.g. packaged motion sensors are available with X10 connections that transmit signals via household 10 power lines, making it unnecessary to directly wire motion sensors to control circuit 30. Additionally, controls are available so that electrically controllable valve could be operated by an X10 controller. However, particular advantages associated with a manual override within the present invention might make remote control of electrically controllable valve 21 undesirable.

Programmable logic controller 40 controls electrically controllable valve 21 via relay K1. A manual override timer 43 provides a timeout when a system user operates a manual "on" control from control panel 34. Relay K2 is activated when the manual "on" control is pressed, turning on electrically controllable valve 21 until the timeout occurs (generally one hour). The system uses a battery 38 to supply operating power for control circuit 30, but the manual override may be used in event of failure of portions of the system or loss of the programmable logic controller 40 control program. Loss of household 10 primary power may also affect portions of the system, depending on implementation, so manual override timer 43 may also be useful during a power failure. A battery charging and sensing circuit 39 connects to battery 38 from control circuit 30. Battery 38 is maintained in a charged state by charging and sensing circuit 39, and automatic operation of the system may be held off while battery 38 has insufficient charge to properly operate the system.

Since battery power should be conserved by the system, electrically controllable valve 21 is preferably a pulse type valve (latching solenoid valve). Therefore, programmable logic controller 40 or manual override timer 43 activate electrically controllable valve 21 using a pulse (generally on the order of 0.5 second) to either turn on or turn off electrically controllable valve. Special circuits within control circuit 30 may be used to produce the pulses, or programmable logic controller 40 may be programmed to produce the desired pulse. Manual override timer 43 will generally comprise a one-shot pulse generator that generates a pulse to turn off electrically controllable valve 21 after the timeout has occurred.

Figure 3:
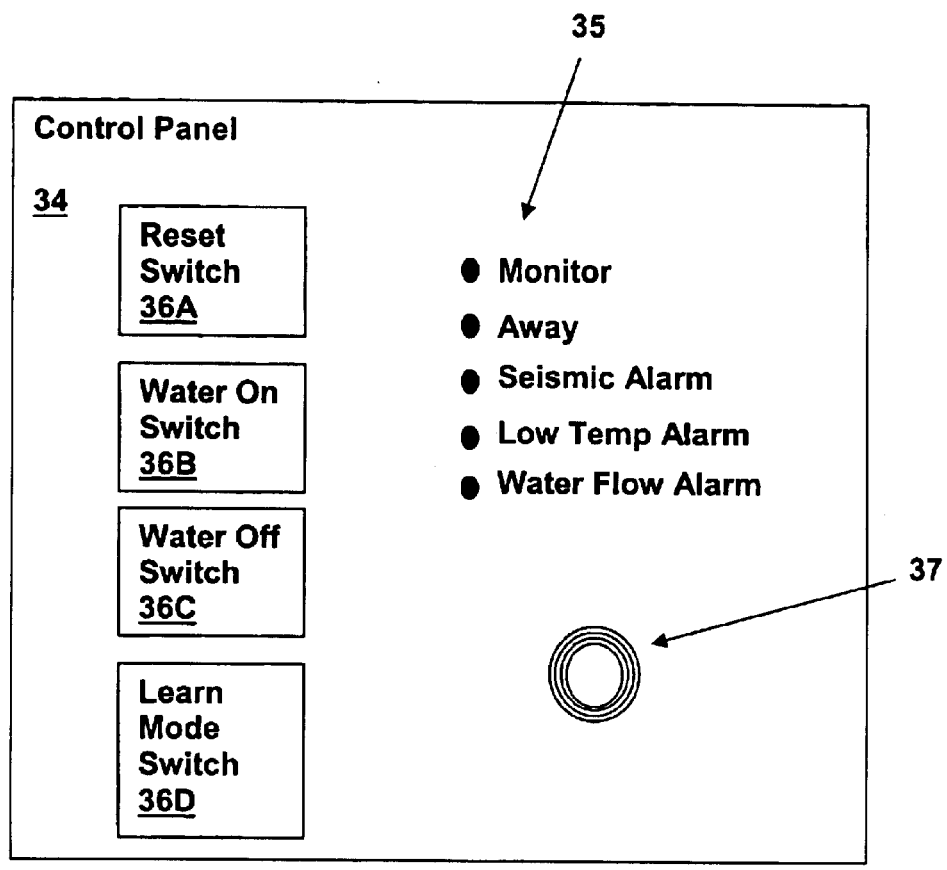
FIG. 3 is a pictorial diagram depicting control panel 34 of FIG. 2.

Referring now to FIG. 3, details of control panel 34 are depicted. Controls are provided as follows: Reset switch 36A provides a means to reset programmable logic controller 40 and other circuits within control circuit 30; water on switch 36B provides one hour of manual override water flow via manual override timer 43; water off switch turns of water flow 36C; and learn mode switch 36D activates a learn mode of operation. Indicators 35 are provided on control panel 34 and may also be located remotely. A monitor indicator notifies a user that the system is actively monitoring the house for motion indicating occupancy; an away indicator indicates that lack of motion sensor activity has caused the system to enter "away" mode. A seismic alarm, low temp alarm and water flow alarm indicator are used to indicate earthquake detect, freezing detect or leak detect, respectively. A buzzer 37 is integrated within control panel 34 to provide an audible alarm, generally in accordance with a logical-OR combination of the above alarm indications.

Learn mode operation in the context of the present invention refers to the determination of motion in a household. The present invention uses a "long" cycle to control operation of electrically controllable valve 21. Essentially, a timer is reset at each detected movement within the household or controlled area of a structure and a period of time of water supply operation is permitted before the water is shut off. This permits appliances such as washing machines and dishwashers to complete their cycles when set by an occupant who then leaves the household. A long cycle is the time period that water is permitted to flow when no motion sensors have detected activity recently within household 10. The long cycle is adjustable, depending on the programmable logic controller program. Code within the programmable logic controller program measures typical motion detection of occupants of the household. The typical use is turned into operational variables to control the long cycle and motion detection sensitivity, generally the long cycle will be within the range of ½ to 2 hours and the motion detection algorithm will require several events before determining that the household is occupied. The programmable logic controller program permits setting of the long cycle via the front panel and also learns sensitivity for the motion detection when learn mode is selected. Learn mode is generally self-terminated after, for example a 24 hour period.

Figure 4:
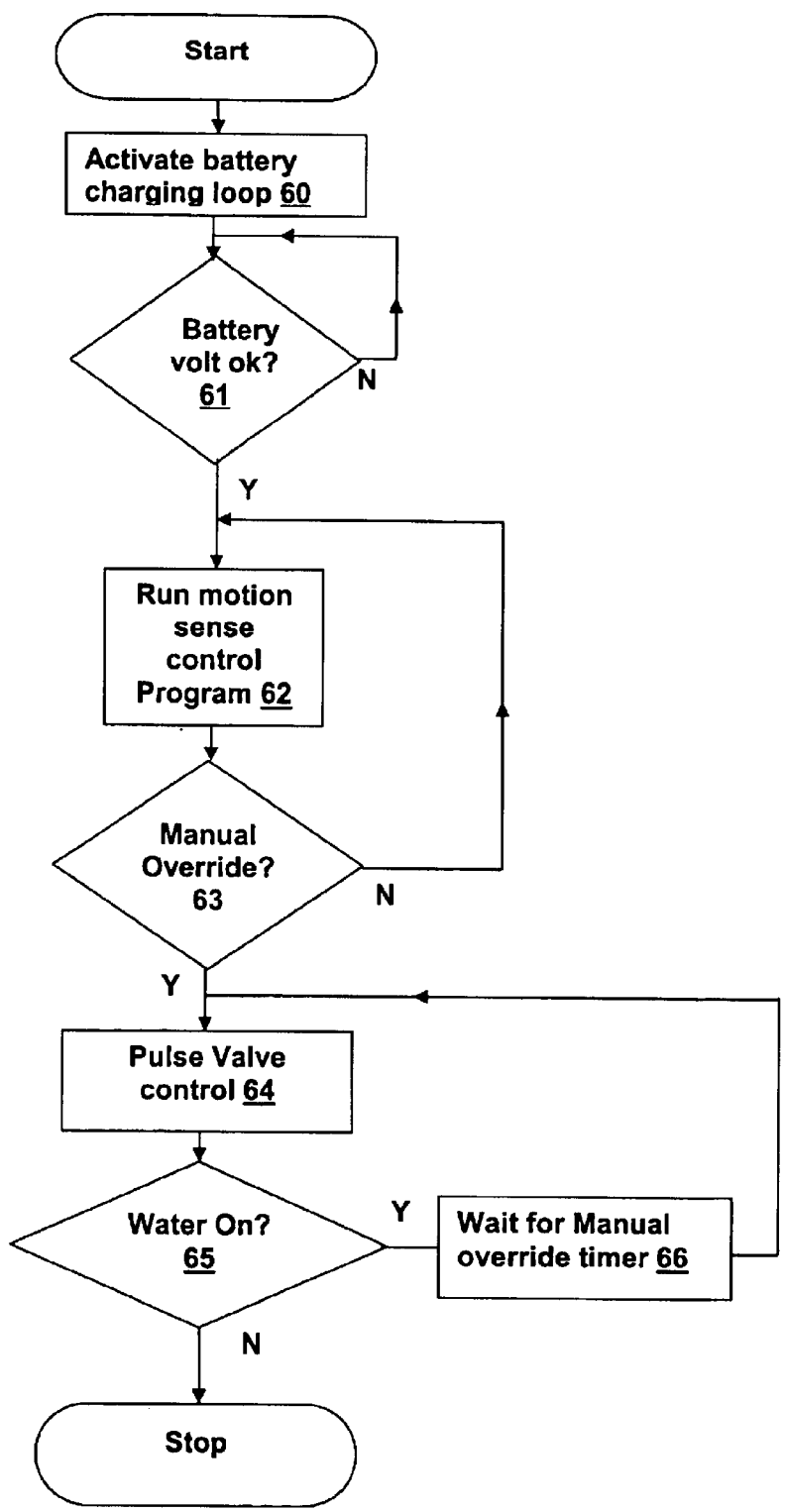
FIG. 4 is a flowchart depicting operation a system in accordance with an embodiment of the present invention.

Referring now to FIG. 4, operation of a system in accordance with an embodiment of the present invention is depicted. First, a battery-charging loop is activated (step 60) that controls charging of battery 38, so that operation may be initiated only after battery 38 has sufficient charge to operate the system. The battery voltage is sampled and when the battery voltage is sufficient (decision 61), the motion sense flow control program is started (step 62). During operation, a manual override switch may interrupt operation (decision 63) to pulse the valve control circuit (step 64) to provide or stop water flow. If water on switch 36B was pressed (i.e. the water is on) (decision 65) then the manual override timer 66 provides the timeout that pulses valve control (step 64) to shut off the valve.

Figure 5:
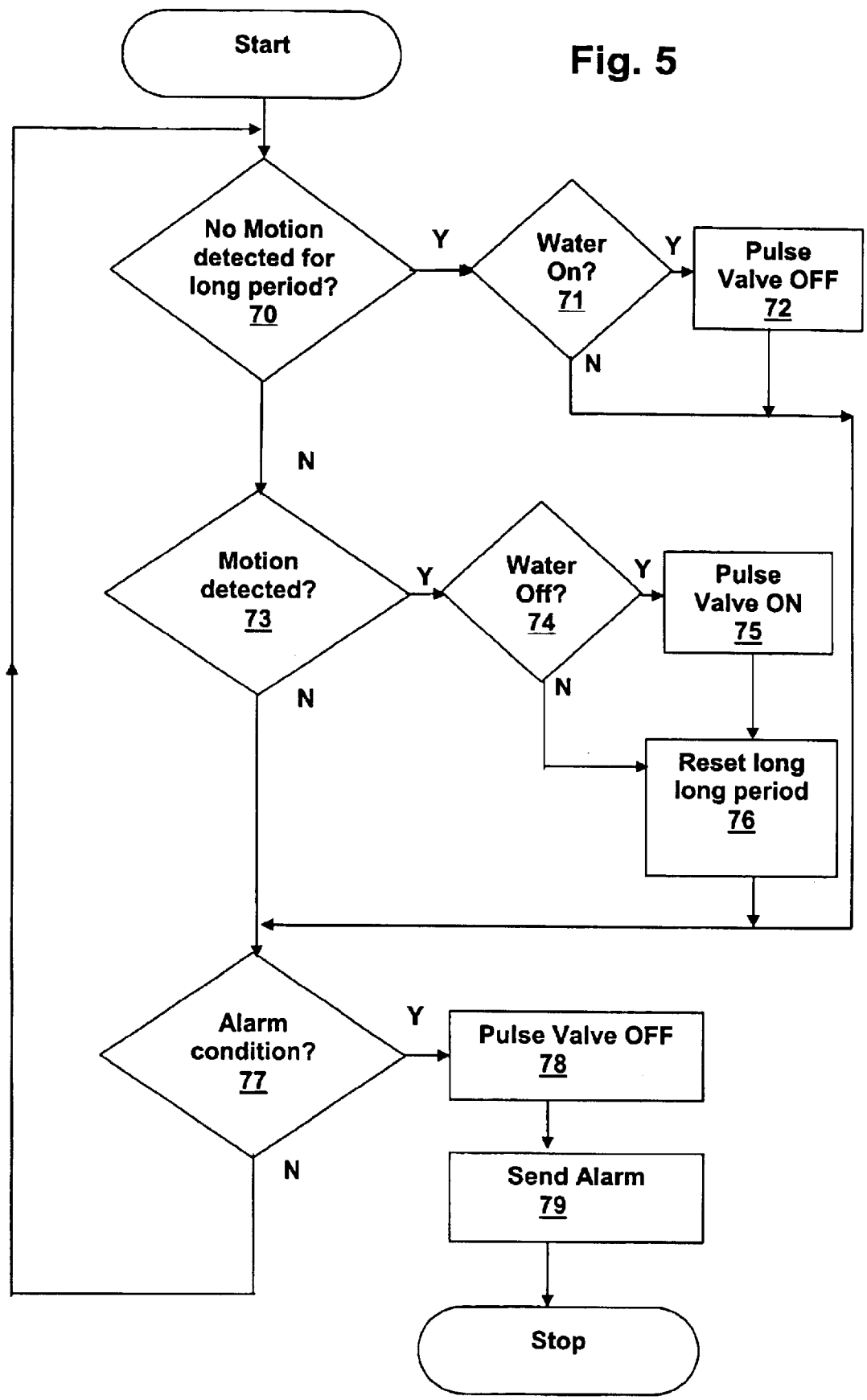
FIG. 5 is a flowchart depicting further operation of a system in accordance with an embodiment of the present invention.

Referring now to FIG. 5, further operation of a system in accordance with an embodiment of the invention is depicted. FIG. 5 illustrates the automatic operation of the motion sense control program activated in step 62 of FIG. 4. Motion detectors are monitored and if no motion is detected for a long period (decision 70) and the water supply is on (decision 71), the valve is pulsed off (step 72). If motion is detected (decision 73) and the water is off (decision 74), the valve is pulsed on (step 75), corresponding to detection of occupancy and the long period is reset (step 76). If motion is detected from a motion sensor (decision 72) and the water is currently turned off (decision 73) the water is turned on (step 74). If an alarm indication is received from sensors, such as thermal or seismic detectors (decision 77), the water is shut off (step 78) and an alarm indication is sent (step 79) which may be a visual indication via indicator 35, an audible alarm via buzzer 37, a remote message via modem/network interface 33, or a combination of the above.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A system for controlling a water supply of a household, comprising:
    at least one electrically controllable valve for controlling a plumbing branch of said water supply feeding multiple water fixtures within said household;
    a control circuit coupled to said electrically controllable valve for operating said electrically controllable valve;
    at least one motion sensor coupled to said control circuit for providing a determination of occupancy of said household, said motion sensor having a zone of activation extending substantially beyond a single water-supplying fixture of said household, whereby said control circuit controls said electrically controllable valve in conformity with said determination of occupancy of said household; and
    a manual override timer circuit for providing a period of water flow wherein inputs of said motion detectors are not used to control said electrically controllable valve.

2. The system of claim 1, further comprising a thermal detection system coupled to said control circuit for shutting off said electrically controllable valve in response to detection of a potentially freezing condition.

3. The system of claim 1, further comprising a seismographic detector coupled to said control circuit for shutting off said electrically controllable valve in response to detection of an earthquake condition.

4. The system of claim 1, wherein said motion sensor is located at an entrance of said household, whereby occupancy is determined by entry and exit from said household, whereby no motion sensor is required in rooms having water-supplying fixtures.

5. The system of claim 1, wherein said control circuit further comprises long cycle timer for controlling a maximum on period of said electrically controllable valve when said motion sensor detects that said household is not occupied.

6. The system of claim 1, further comprising a timer for determining whether or not said motion sensor has detected activity for a predetermined inactivity period.

7. The system of claim 1, wherein said electrically controllable valve comprises multiple electrically controllable valves, each associated with one or more motion sensors coupled to said control circuit, and wherein said multiple electrically controllable valves are inserted in multiple plumbing branches of said household water supply for supplying water to multiple fixtures, whereby zones of occupancy are determined by said motion sensors, and wherein each of said electrically controllable valves associated with occupied ones of said zones are enabled as determined by a detection of occupancy by said associated one or more motion sensors.

8. A system for controlling a water supply of a household, comprising:

- at least one electrically controllable valve for controlling a plumbing branch of said water supply feeding multiple water fixtures within said household;
- a control circuit coupled to said electrically controllable valve for operating said electrically controllable valve; and
- at least one motion sensor coupled to said control circuit for providing a determination of occupancy of said household, said motion sensor having a zone of activation extending substantially beyond a single water-supplying fixture of said household, whereby said control circuit controls said electrically controllable valve in conformity with said determination of occupancy of said household, and wherein said control circuit comprises a programmable controller having a memory for storing program instructions and a processor for executing said program instructions, program instructions resident within said memory for adjusting said control of said electrically controllable valve in conformity with learned patterns of motion detected by said motion sensor, and wherein said program instructions include a learning module for detecting patterns of occupancy of said household.

9. The system of claim 8, further comprising a manual override timer circuit for providing a period of water flow wherein inputs of said motion detectors are not used to control said electrically controllable valve.

10. A system for controlling a water supply of a household, comprising:

- at least one electrically controllable valve for controlling a plumbing branch of said water supply feeding multiple water fixtures within said household;
- a control circuit coupled to said electrically controllable valve for operating said electrically controllable valve; and
- at least one motion sensor coupled to said control circuit for providing a determination of occupancy of said household, said motion sensor having a zone of activation extending substantially beyond a single water-supplying fixture of said household, whereby said control circuit controls said electrically controllable valve in conformity with said determination of occupancy of said household, and wherein said control circuit further comprises an input for receiving a signal from a sprinkler control system, whereby sprinkler system use of said water supply may be permitted when said motion detectors detect no activity within said household by turning on said electrically controllable valve during a period of activation of said signal.

11. A method for controlling a water supply of a household, said method comprising:

- detecting motion within said household;
- determining whether or not said household is occupied in conformity with said detection;
- incrementing an interval timer after a determination of non-occupancy is made for permitting operation of said water supply for a predetermined interval after said determination, whereby appliances are permitted to complete their cycles; and
- in response to determining that said household is unoccupied, shutting off said water supply in conformity with said determination and a state of said interval timer.

12. The method of claim 11, further comprising:
detecting seismic activity; and
wherein said water supply is further controlled in conformity with said seismic detection.

13. The method of claim 11, further comprising:
detecting an ambient temperature; and
wherein said water supply is further controlled in conformity with said detected temperature.

14. The method of claim 11, further comprising detecting a flow of said water supply, and wherein said controlling further controls said water supply in conformity with said detected flow.

15. The method of claim 11, further comprising resetting said interval time upon each detection of motion in said household.

* * * * *